United States Patent
Dioguardi

(10) Patent No.: US 6,721,991 B2
(45) Date of Patent: Apr. 20, 2004

(54) ELASTIC HINGE WITH INCLINED PLANE EYELET FOR AUTOMATIC CLOSING OF SPECTACLE TEMPLES

(75) Inventor: Franco Dioguardi, Belluno (IT)

(73) Assignee: D.O.T. S.a.s. di Dioguardi Franco & C., Calalzo di Cadore (IT)

( * ) Notice: Subject to any disclaimer, the term of this patent is extended or adjusted under 35 U.S.C. 154(b) by 0 days.

(21) Appl. No.: 10/192,972

(22) Filed: Jul. 11, 2002

(65) Prior Publication Data

US 2003/0009849 A1 Jan. 16, 2003

(51) Int. Cl.$^7$ ................................................. G02C 5/22
(52) U.S. Cl. ........................ 16/228; 16/312; 16/284
(58) Field of Search .................... 16/228, 284, 312, 16/313; 351/111, 112, 113, 114, 121

(56) References Cited

U.S. PATENT DOCUMENTS

| | | | | |
|---|---|---|---|---|
| 2,098,921 A | * | 11/1937 | Mandaville | 351/113 |
| 2,874,609 A | * | 2/1959 | Ducati | 351/113 |
| 3,064,530 A | * | 11/1962 | Vigano | 351/121 |
| 3,837,735 A | * | 9/1974 | Guillet | 351/113 |
| 3,957,360 A | * | 5/1976 | Villani | 351/113 |
| 4,005,930 A | * | 2/1977 | Guenin | 351/113 |
| 4,244,081 A | * | 1/1981 | Beyer et al. | 16/228 |
| 4,747,183 A | * | 5/1988 | Drlik | 16/228 |
| 4,750,828 A | * | 6/1988 | Sartor | 351/115 |
| 4,832,479 A | * | 5/1989 | Beyer et al. | 351/153 |
| 5,406,339 A | * | 4/1995 | Chen | 351/153 |
| 5,515,575 A | * | 5/1996 | Pinazza | 16/228 |
| 5,627,608 A | * | 5/1997 | Chao | 351/113 |
| 5,815,899 A | * | 10/1998 | Chao | 16/228 |
| 5,841,508 A | * | 11/1998 | Groscurth | 351/113 |
| 6,393,664 B1 | * | 5/2002 | Habegger et al. | 16/335 |
| 6,481,053 B2 | * | 11/2002 | Desbiez-piat | 16/228 |

FOREIGN PATENT DOCUMENTS

| | | | |
|---|---|---|---|
| DE | 3401213 A1 | * | 7/1985 |
| JP | 8-313851 | * | 11/1996 |

* cited by examiner

*Primary Examiner*—Chuck Y. Mah
(74) *Attorney, Agent, or Firm*—Bucknam and Archer

(57) ABSTRACT

The present invention concerns a hinge for the hinging of spectacle temples, which allows the automatic closing of the temples on the same front of spectacle which has been removed from the head or which features one or both temples in open or wide-open position. A hinging element is provided attached to the endpiece of the front, which is cam-shaped with an eccentric profile progressively increasing from its internal position to its external position and on which a follower runs. The follower is guided in an axial hole 23 in the temple 20 to be hinged and together with an elastic medium which acts axially with the hinge pin while the follower works on an inclined plane produced by the shape of the cam to help the automatic return of the temple 20 in the closing phase.

9 Claims, 4 Drawing Sheets

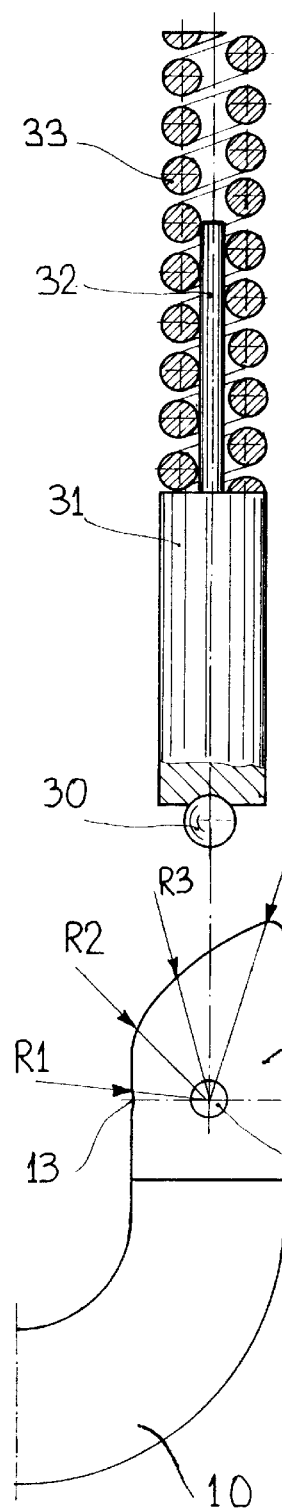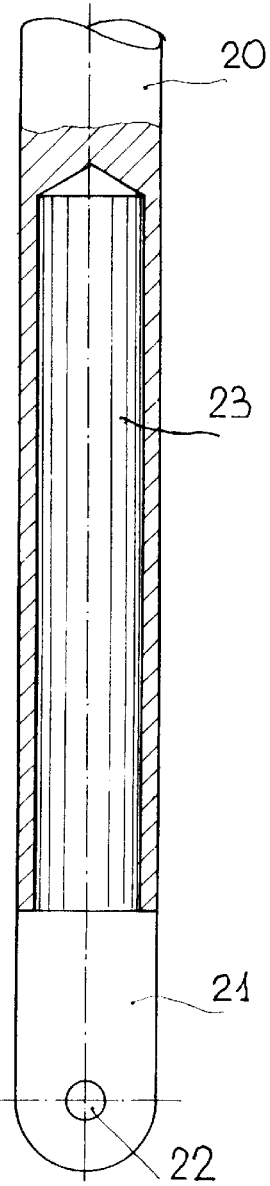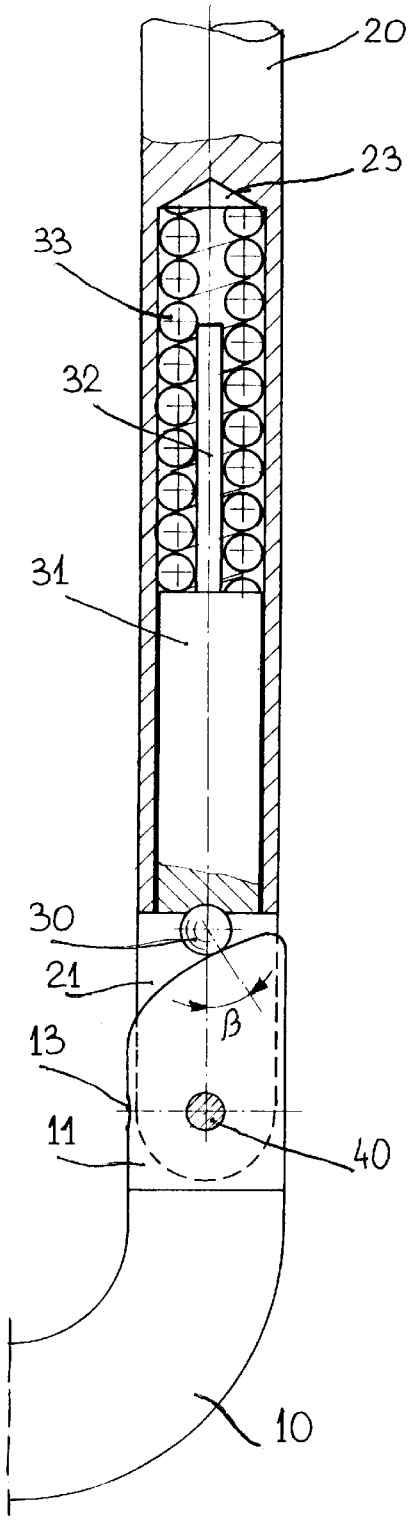

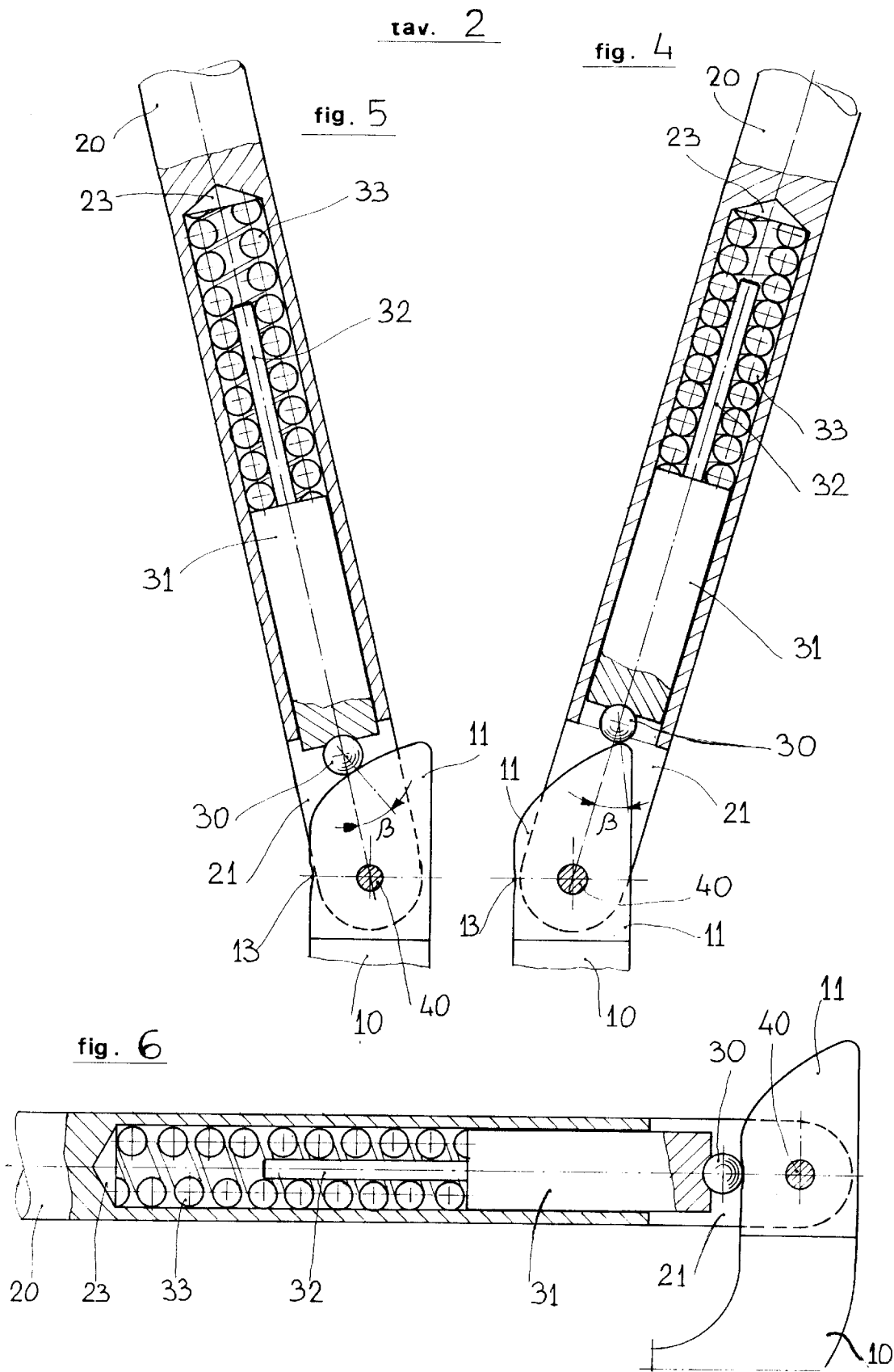

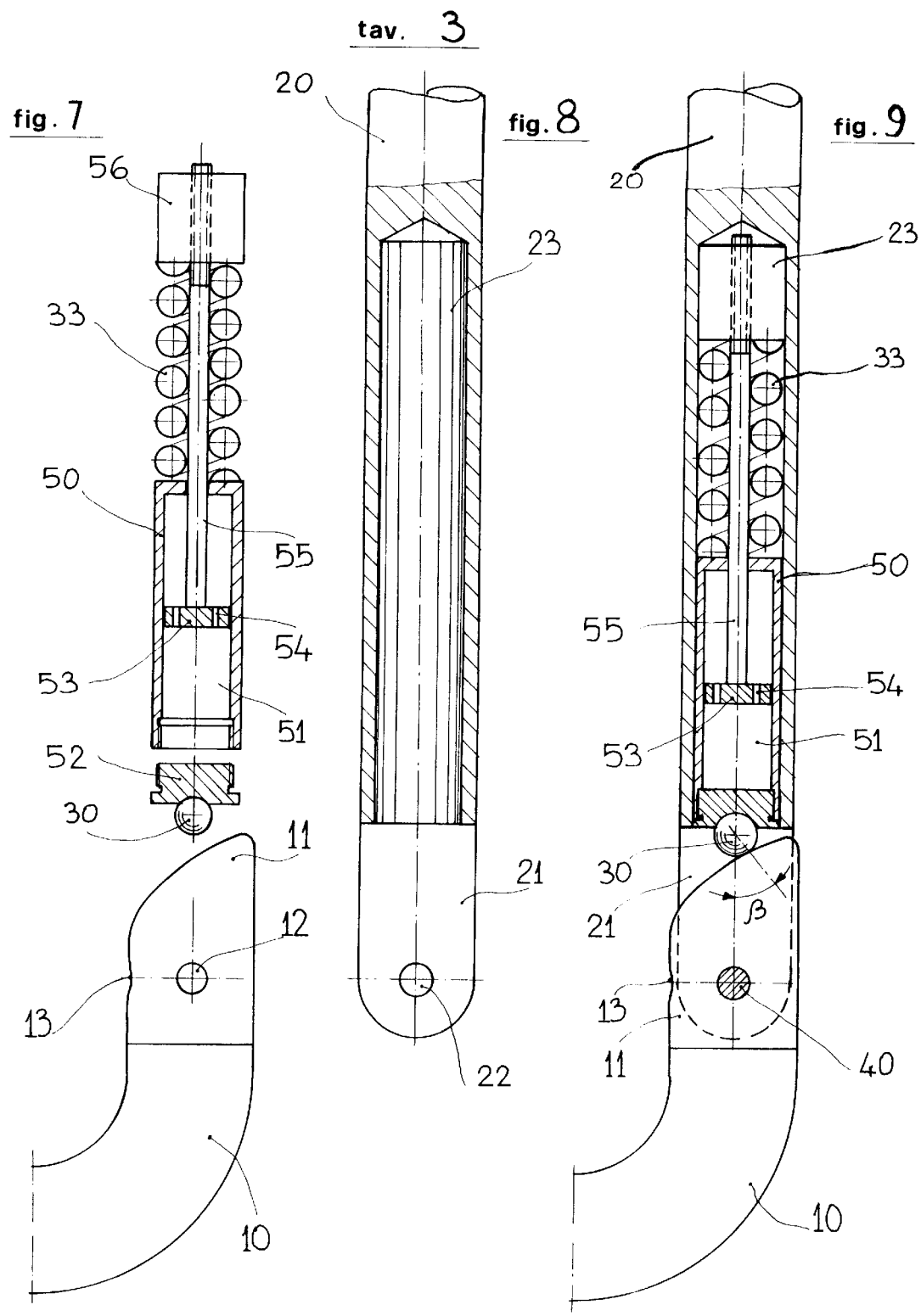

tav. 4

ELASTIC HINGE WITH INCLINED PLANE EYELET FOR AUTOMATIC CLOSING OF SPECTACLE TEMPLES

It is the object of the present invention a new type of hinge, particularly for the hinging of temples on the front of spectacles, which allows the automatic closing, free or adjustable, of the temples on the same front of spectacle which is removed from the head or which however features one or both temples in open or wide-open position.

The main feature of the present invention is to provide for a hinging element, generally the stationary unit attached to the endpiece head or side end of the front, which is cam-shaped with a particular profile, on which a guided follower runs, with the possibility of interposing a dynamic compensation device, into a hole made on the head of the other part or element to be hinged, being this follower driven by an elastic medium which acts axially to the hinge pin and being the cam profile provided with a progressive shape which is always disposed on a plane inclined with respect to the thrust axis of the roller follower.

The very large majority of the devices for increasing the elasticity of the spectacle temples is obtained with the two side ends of the front endowed with a hinge head which is cam-shaped, having two sides orthogonal to each other and equidistant from the hinge hole, after previous adequate rounding off their convergence angle.

As it is known, though in the several construction forms known at present, the temple end to be attached is hinged to this square head, after that a follower has been inserted in the axial head hole of the cam, which follower is pushed against the sides of the same square head, by an elastic medium, so achieving the aim of a moderate and controlled pressure of the temples on the head, for an easier use of the spectacles, in addition to the possibility of having a closing or opening release, when passing from one to the other side of the square head.

This system for improving the elasticity of the spectacle temples has undoubtedly made wearing spectacles easier, without having to push continually the spectacles back up the nose to place them in the correct optical position, since conventional temples did not ensure the positioning on the head.

Yet, it is not infrequent the case of spectacle temples which, however releasing from an open to a closed position and vice versa, do not ensure the stability of the open position, since, for wear of the cam or for stress relaxation of the elastic medium, its follower does not rest anymore on one of the sides of the square head of the front end, causing a certain backlash or oscillation of the same temple.

Moreover, it is known that the abrupt release with which the temple opens or closes on the endpiece, causes an annoying feeling of being not able to control its motion. In particular, when closing the temples on the front, this sudden release may also constitute a serious danger because of the contact of the temples with the eyes.

Primary object of the present invention is that of accomplishing a spectacle whose temples can close automatically, gradually, and without sudden releases.

Another object of the present invention is that of removing any possible backlash or idle oscillation of the temple, particularly following wear by contact with the fixed part of the hinge.

These and other objects are actually attained with the present invention, as it can be inferred by the following description of one of its construction forms, only illustrative and not restrictive, hereunder illustrated also with the aid of No. 11 schematic illustrations, reproduced in the four enclosed tables and of which:

FIG. 1 of table 1 represents an overhead and exploded view of a follower with its elastic medium and an endpiece or side end of front to be connected to each other, by previous insertion of the follower in the seat of the temple end of FIG. 2;

FIG. 2 represents in fact an overhead and axial section view of the temple end to be hinged to the endpiece of FIG. 1, by previous interposition of the follower of FIG. 1;

FIG. 3 represents an overhead and axial section view of the temple of FIG. 2 attached and hinged to the head of the endpiece of FIG. 1, by previous interposition of the follower of the same FIG. 1, being randomly represented in a position by way of example orthogonal to the plane of the spectacle front;

Figure 10:
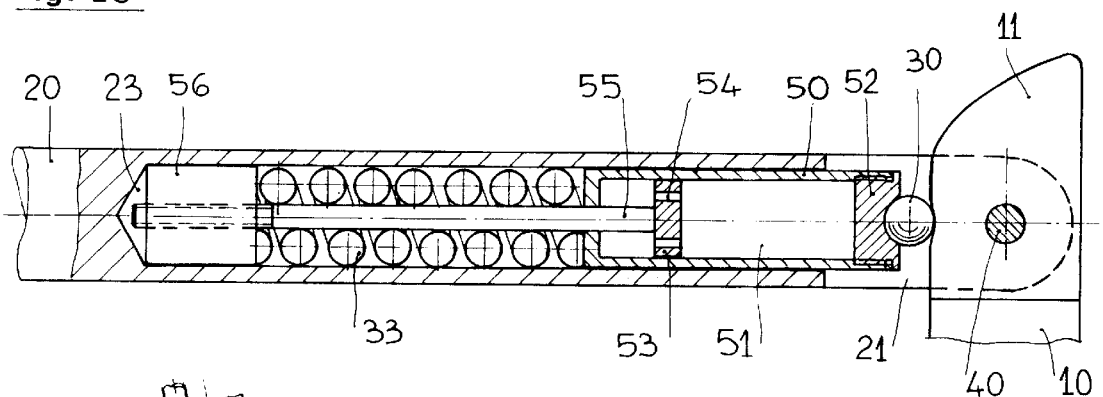
Figure 11:
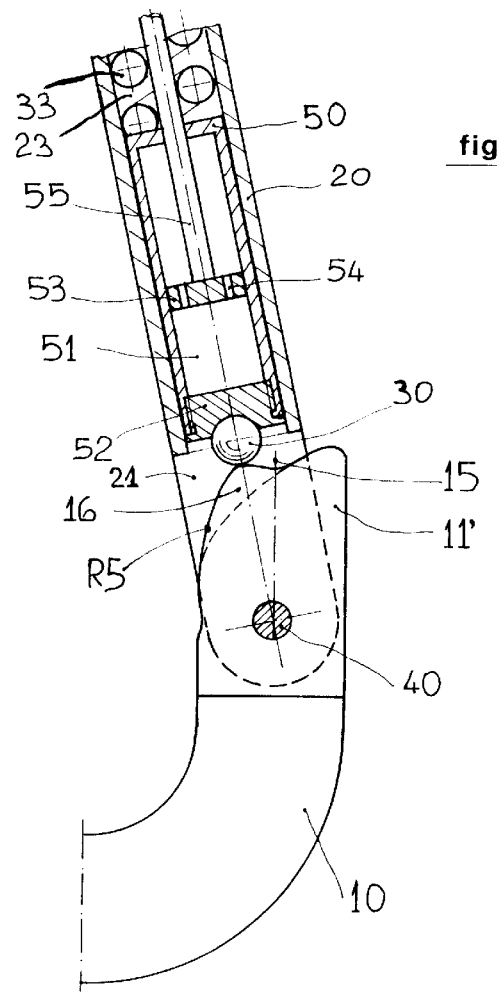

FIG. 4 of table 2 represents an overhead and axial section view of the same elements of FIG. 3, being the temple represented in its position of maximum possible opening with respect to the plane of the front of spectacle;

FIG. 5 represents an overhead and axial section view of the same elements of FIGS. 3 and 4, being the temple represented in a randomly given point of its motion on the eyelet of the endpiece;

FIG. 6 represents an overhead and axial section view of the same elements of FIGS. 3 to 5, being the temple showed in its normal closed position on the spectacle front;

FIGS. from 7 to 9 of table 3 represent a first construction variant and improvement of the hinge device hereto illustrated, in which it is provided for an interposition of a compensation chamber to regulate the closing and opening speed of the temple and more in particular:

FIG. 7 of table 3 represents an overhead and axial section view of a chamber, which houses a piston with rod and its rod guide, being sealed by a cap which acts as follower when it is put in contact with the progressive cam of the endpiece already shown in FIG. 1, determining a dynamic compensation device;

FIG. 8 represents an overhead and axial section view of the temple end to be hinged, being similar to the temple end in FIG. 2;

FIG. 9 represents an overhead and axial section view of the elements of FIG. 7 attached to the temple end of FIG. 8, being the temple by way of example set orthogonally to the plane of the spectacle front;

FIG. 10 of table 4 represents an overhead view similar to the view in FIG. 9, being the temple represented in its regular closed position on the front of the spectacles;

FIG. 11 represents another construction variation of the invent, with respect to the solution in figures from 7 to 10.

In every drawing the same elements are represented, or are meant to be represented, with the same reference number.

The basis of the present invent is the particular shape which is given to the eyelet or head cam 11 of the front end or endpiece 10.

With respect to the axis of its hinge hole 12, every point on the perimeter of the head-cam 11 features a radius, for example R2–R3–R4, with values increasing with respect to the minimal value of R1, where this increasing can be regular or not.

In the various figures of the enclosed tables, the individuation of the minimum radius R1 is made easier by the presence of a notch 13 on the perimeter, which helps the stability of the closing position of the temple 20 on the endpiece 10.

According to the construction solution proposed in the figures of tables 1 and 2, a temple end 20 is provided with one or two head prongs 21 with hinging hole 22 and with axial blind hole 23 having an adequate and set in advance depth.

A roller follower 30 is guided and pushed by a cylindrical case 31 preferably provided with guide rod 32 fit to guide and align the coils of an elastic medium 33 when the same elastic medium 33 and the case 31 are housed into the opening 23 of the temple 20.

With reference to FIG. 3, it can be inferred that the hinging of the temple 20 to the endpiece 10 is made possible by the presence of a regular pin or hinge screw 40 which is made to pass through the holes 22 of the temple end 21 and through the hole 12 of the cam eyelet 11, after they have been previously aligned.

To carry out an easier alignment of the holes 22 and 12, once the elastic medium 33 and the cylindrical case 31 have been inserted into the opening 23 of the temple 20, the temple 20 is adequately set in orthogonal position as in FIG. 6, so that the follower 30 rests on the notch 13, obtained near the minimum radius RI of the cam 11, and applying a light compression of the elastic medium 33, as to get the desired alignment.

To shift the temple 20 to any of the intermediate positions exemplified in FIGS. 5 and 3 or in the position of maximum opening exemplified in FIG. 4, it is necessary to apply an adequate rotational torque of the same temple 20, by which force the follower 30 can run along the increasing profile from R1 to R4, of the cam eyelet 11 of the endpiece 10.

As shown in the mentioned FIGS. 3–4 and 5, the follower 30 is always kept on the axis of the temple 20, by means of its housing into the cylindrical case 31, while its point of rolling contact along the profile of the cam 11 is always shifted of a value β which is inversely proportional to the inclination of the cam 11 with respect to the axis of the temple 20.

In fact, the greater is the difference between the minimum radius R1 and the maximum radius R4, in addition to its intermediate points R2 and R3 of the cam 11, the smaller the width of the rolling contact angle β will be, being evident that the inclined sliding surface of the follower 30 on the profile of the cam 11 will be greater.

The force exerted to open the temple 20 is naturally absorbed by the elastic medium 33 which, according to a well-known technique, is sized in order to ensure the maximum opening of the temple 20, for example in the condition of FIG. 4, preventing, with the packing of its coils, another rotation of the temple 20, beyond the fixed limit.

The normal opening, until the maximum opening of the temple 20, ensures the best conditions for wearing the spectacle, making it fit for the variety of head shapes of the wearers, and ensuring also the stability over time of the correct pressure degree on the temples, since the follower always finds its ideal position along the variable profile of the cam 11, so achieving one of the specified aims.

Ceasing the opening action which keeps the temple in the most adequate open position, there is the reaction of the elastic medium 33, which pushes the follower 30 to set itself rapidly towards the perimeter of the cam 11, whose radius is always smaller, as to get the basic position R1, and then to take the temple 20 to the closed position on the endpiece 11, housing the follower in the notch 13.

It is so accomplished another aim of the invention, which is given by the possibility of an automatic closing of the spectacle temples 20, once ceased the use or, however, the opening effort.

From what has been described and exemplified until now, it seems evident that the bigger is the difference between the minimum radius R1 and the maximum radius R4 of the cam, and therefore the smaller is the width of the rolling contact angle β, the greater is the rapidity or speed of opening of the temple 20 on the endpiece 11.

The same closing speed of the temple 20 is then determined by the reaction strength of the elastic medium 33, therefore by its elasticity degree.

In other words, adequately controlling the power of the elastic medium 33, by means of the inclination angle β of the follower 30 on the profile of the cam 11, it is possible to create spectacles with the temples 20 able to ensure the desired pressure on the head, when the same spectacles are worn, in addition to having temples able to close automatically at the desired speed.

Another contribution to the control and reduction of the closing speed of the temple 20 can be given by the lining of the cylindrical case 31, with an appropriate coating of viscous material which, interposing itself between the surface of the same cylindrical case 31 and the surface of the cylindrical opening 23, delays and reduces the reaction movement of the elastic medium 33, determining a slower translation of the follower 30 on the cam 11, with consequent reduction of the closing speed of the temple 20.

The advantages of pressure on the temples and of automatic closing of the spectacle temple obtained according what has been until now described and illustrated, are subsequently improved by the application of the compensation device illustrated in FIGS. from 7 to 10.

With reference to FIG. 7, it is inferred that, for the usual cam 11 of the endpiece 10 already described with reference to FIG. 1 in the place of the cylindrical case 31 of the follower 30, a chamber or dynamic compensation chamber 50 with internal space 51 and with hermetic sealing cap 52 on which the follower 30 seats is used.-

The space 51 of said chamber 50 houses a plate or piston 53 with loops 54 and with rod 55 which, coming out axially from the chamber 50 on the opposing side to that of the cap 52, it is made integral with a bottom nut 56 which controls the compression of an elastic medium 33.

The space 51 of the chamber 50 is filled with an adequate viscous material, before being closed with its hermetic sealing cap 52, making the same material to pass through the loops 54 of the plate 53, as to gain a complete filling of the same space 51.

Said chamber 50 is then inserted, complete with its elastic medium 33 and with its adjusting nut 56, into the opening 23 of the temple to be hinged 20, so that the same nut 56 beats against the bottom of said opening 23, as exemplified in FIG. 10.

Starting preferably from the orthogonal position of FIG. 10, it is now possible to align the hole 12 of the cam 11 of the endpiece 10 with the holes 22 of the hinging prongs 21 of the temple 20, after that the follower 30 is been put in its seat of the cap 52 and after that the same follower 30 is positioned on the notch 13 of the cam 11, with consequent application of the hinge pin or screw 40 which attaches the two parts that have to be hinged.

Given the features of the cam 11 which presents radii of development progressively increasing, from R1 to R4, as already specified, it seems evident that, with an appropriate effort of opening of the temple 20, there is the passage from the position of the temple as in FIG. 10 to the state of FIG. 9, until coming to a state of maximum opening or, however, of optimal position, with regard to the morphological characteristics of the person who must wear the spectacles, as already previously showed.

With particular reference to FIG. 9, it is inferred that, ceasing the action or the presence of the body which keeps the temple 20 in the exemplified orthogonal position, with respect to the front of spectacles, the reaction of the elastic medium 33 pushes the follower 30, by means of the chamber 50, to look for the peripheral point of the cam 11 which has a radius immediately smaller than that on which it is in contact, with consequent trend to a quick return to the closed position, according to what has already been specified.

However, the presence of the viscous liquid in the space 51 of the chamber 50 determines a brake to the reaction of the elastic medium 33, since, to shift axially the same chamber 50 which has to push the follower 30 towards the smallest radius of the cam 11, it is necessary a progressive transferring of the liquid from one to the other side of the opening 51, passing through the loops 54 of the plate 53.

The passage of the viscous liquid through the loops 54 of the plate 53 is compelled by the fact that the same plate 53 presents a regular stationary position fixed by the rod 55 with respect to the bottom of the opening 23 of the temple 20, against which it is kept by the thrust of the elastic medium 33 on its adjusting nut 56.

In the end, the return phase or closing phase of the temple 20, whose automaticity is made possible by the particular shape of the cam 11 and by the presence of an elastic medium 33 acting on the follower 30, is restrained and controlled by the presence of the viscous liquid into the space 51 of the liner 50, which is put in axial translation by the reaction of the elastic medium 33 which pushes the liner 50 and the follower 30 against the side surface of the cam 11, yet being this thrust reduced in intensity and time by the passage of the fluid through the perforated plate 53 which remains fixed into the liner 50, while this shifts gradually in axial sense.

With an adequate shaping of the cam 11, to determine the more or less wide inclination angles β of the rolling contact, inversely to the difference between the minimum radius R1 and the maximum radius R4 of the progressive profile of the cam 11, united to the power and control of the elastic medium 33, besides to the viscosity degree of the fluid inserted in the space 51 of the liner 50 and to the overall surface of the loops 54 of the plate 53, it is possible to obtain any type of temple for spectacle having automatic return adjustable in speed, in addition to in the power of pressure on the temples.

It is of course possible to replace the viscous liquid to be inserted in the liner 50 with another liquid, for example water or even air, as it is possible to vary and fit the overall surface of the loops 54, even if the prevalently stated viscous liquid seems better with regard to the sealing degree on the outlet hole of the rod 55.

With reference to FIG. 11, it is highlighted the possibility of another constructive variant, for the application of the device until now illustrated even in case of spectacles which require a position of normal stationary open position of the temples on the front.

Without limiting the foregoing illustrated device, as regards the temple 20 and its system of controlled thrust of the follower 30 for its closing, the variation consists of the realisation of a small sliding plane of support 15 obtained on the hinging axis of the cam 11, by previous realisation of a shoulder 16 which is linked to the principle of a radius R5 of decreasing curvature towards the minimum radius R1 near the final notch 13.

As an effect of the presence of this plane 15, the follower 30, after the prospective return from the position of maximum opening, will rest on the plane 15, in axis with the temple 20 and the pin 40, in order to ensure the stability of the position of normal opening of the same temple 20, by previous gradual bedding of the plate 53 in the liner 50.

In case of eventual closing of the temple 20, after pushing it lightly so that the follower 30 exceeds the widest point of the radius R5 of the shoulder 16, its closure starts again according to which already illustrated, until bringing itself on the closure notch 13 of the cam 11.

Other innovations are of course possible, with reference to the solutions until now exemplified, as for example the fact to replace the spherical follower 30 with a hemispherical head of the cylinder 31 or of the cap 52, as well as it is possible to replace the coiled spring 33 with another known elastic medium acting by compression.

These and other similar changes or adaptations are meant, however, to be part of the originality of the invent which is to be protected.

What is claimed is:

1. An elastic hinge for spectacles which permits the automatic closing on the front piece of the spectacles of the spectacle temples from an open position thereof, said elastic hinge comprising:

a hinging element (11) forming a head part of an endpiece (10) of the front piece of the spectacles, said hinging element (11) including a cam shaped profile developing a progressively increasing eccentric curvature from a closed positions to a maximum open position of a temple (20);

a follower (30) guided in an axial hole (23) formed in a hinged end of said temple (20);

a hinge pin (40) hingedly connecting the hinged end of said temple (20) along the axis thereof with said hinging element (11); and biasing means (33) biasing said follower (30) axially with respect to said temple (20) towards said hinge pin (40) along a thrust axis so that said follower (30) makes rolling contact with the cam shaped profile of said hinging element (11) at a point thereon shifted by an angle β from said thrust axis whereat the cam shaped profile is effectively an inclined plane, whereby said follower (30) is continuously urged to follow the curvature of the cam shaped profile of said hinging element (11) to a closed position of said temple (20).

2. The elastic hinge for spectacles as defined in claim 1, wherein said hinging element (11) includes a hinging hole (12) whereat said hinged end of said temple (20) is hingedly connected by hinge pin (40) and the cam shaped profile of said hinging element (11) is shaped as an eccentric cam with a minimum radius R1 corresponding to the closed position of the temple (20) and with a progressive eccentricity leading to a maximum radius R4 corresponding to the point of maximum opening of the temple (20), with respect to the axis of the hinging hole (12).

3. The electric hinge for spectacles as defined in claim 2, wherein follower (30) slides or rolls along the cam shaped profile of said hinging element (11) with a point of contact defining a shifting angle β with respect to the thrust axis which determines an inclined plane at the cam shaped profile of said hinging element contact on which said follower (30) guided by the biasing action of said biasing means (33) seeks the point of minimum curvature radius of said cam shaped profile.

4. The elastic hinge for spectacles as defined in claim 3, wherein the value of the angle β is determined to be inversely proportional to the differential rate of the varying radius of the cam shaped profile of hinging element (11) from R1 to R4.

5. The elastic hinge for spectacles as defined in claim 4, which further includes a case (31) disposed in said axial hole (23) of said temple (20) on which said follower (30) is mounted for contact with the cam shaped profile of said hinging element (11) and said case (31) is acted on by said biasing means (33).

6. The elastic hinge for spectacles as defined in claim 5, wherein the degree of pressure exerted by the temple (20) on a wearer of the spectacles is determined by the thrust of biasing means (33) on follower (30) cooperating with angle β of the cam shaped profile of said hinging element (11) which also determines the closing strength and closing rapidity of the temple (20), wherein the intensity of the thrust of the biasing means is inversely proportional to the angle β.

7. The elastic hinge for spectacles as defined in claim 4, which further includes a dynamic compensation chamber (50) disposed in said axial hole (23) of said temple (20) on which said follower (30) is mounted for contact with the cam shaped profile of said hinging element (11), said dynamic compensation chamber (50) having an internal space (51) housing a piston (53) having communication loops (54) therein communicating between the thus divided space of said space (51) of dynamic compensation chamber (50), a guide rod (55) of said piston (53) is provided with a bottom nut (56) which engages with said biasing mans (33) so as to control the pre-compression of said biasing means and which rests on a bottom of said axial hole (23) to fix the position of said piston (53) in said hole (23).

8. The elastic hinge for spectacles as defined in claim 7, wherein the internal space (51) of said dynamic compensation chamber (50) is filled with a viscous fluid so that with the closing movement of said temple (20), the resulting gradual passage of the fluid through said loops (54) from one side of said piston (53) to the other side in said space (51) delays and distributes the thrust intensity of said biasing means (23) on said dynamic compensation chamber (50) so as to dampen the axial movement of said dynamic compensation chamber within said axial hole (23) of said temple (20) and thus the movement of said temple (20).

9. The elastic hinge for spectacles as defined in claim 1, wherein the cam shaped profile of said hinging element (11) includes a shoulder (16) intermediate the curvature defining the closed and maximum open positions of the temple (20) and a support plane (15) disposed intermediate said shoulder (16) and the curvature of the cam shaped profile of said hinging element (11) defining the maximum open position of the temple (20) on which said follower (30) rests to define a normal open position of said temple (20).

* * * * *